July 1, 1969     K. LEISTER     3,452,965

MIXING APPARATUS HAVING CONCENTRIC WORM MEMBERS

Filed Dec. 12, 1967     Sheet 1 of 2

INVENTOR.
KARL LEISTER
BY
Burgess, Dinklage & Sprung
ATTORNEYS

United States Patent Office 3,452,965
Patented July 1, 1969

3,452,965
MIXING APPARATUS HAVING CONCENTRIC WORM MEMBERS
Karl Leister, Krefeld, Germany, assignor to Farbenfabriken Bayer Aktiengesellschaft, Leverkusen, Germany, a corporation of Germany
Filed Dec. 12, 1967, Ser. No. 690,016
Claims priority, application Germany, Dec. 14, 1966, F 50,926, F 50,927
Int. Cl. B01f 15/02, 9/08, 7/08
U.S. Cl. 259—6                    10 Claims

ABSTRACT OF THE DISCLOSURE

Mixing apparatus having an inlet, an axial outlet, as well as a rotatable annular worm thread member and a rotatable worm core member concentrically therewithin, preferably in wiping contact with one another; said core member optionally having a worm thread press extension at the axial outlet to force discharge mixed material against a counterpressure, and/or an auxiliary worm thread means along at least a portion of its axial length to improve the mixing action and preferably also achieve with appropriate counter-pitch thereof back-conveying and back-mixing of material thereat; said worm core member serving to mix the material and the worm thread member serving to convey the material being mixed from the inlet to the outlet, optionally without intermixing of materials conveyed by adjoining convolutions of the worm thread member when said members are in wiping contact so as to maintain uniform mixing residence time of the product discharged at the outlet.

---

The present invention relates to a worm mixing apparatus for the continuous carrying out of physical or mechanical mixing as well as chemical reactions, and more particularly to such an apparatus which can handle liquids, solids or gaseous components and achieve more efficient and versatile mixing and conveying of materials, the latter being alterable independently of one another whereby residence times and quality and intensity of mixing can be accurately controlled.

U.S. Patent 3,269,708 is directed to a mixing apparatus having concentric worm members, including an annular worm thread member and a worm core member concentrically therewithin, both being independently rotatable and disposed in wiping contact with each other, such that the core member effects the mixing while the thread member effects the conveying.

This arrangement is satisfactory in most cases for controlled mixing of material by the core member and for controlled conveying of such material by the thread members from the inlet to the outlet without intermixing of materials conveyed by adjoining convolutions of the thread member so as to maintain a uniform mixing residence time before discharge at the outlet of material. However, where a counterpressure is exerted on the material being discharged at the outlet such as when the outlet communicates with a pressure filter, pressure nozzle, or the like, the thread member cannot always discharge efficiently the mixed material. The ability of the material to be discharged against such a counterpressure is dependent upon the degree of stiffness of the annular worm thread member, e.g. its resistance to rotational and axial distortion under the existing torque, etc., the viscosity of the material being handled, the degree of counterpressure encountered, and the like.

Resort to constructional expedients such as piston pumps, separate, e.g. downstream, conveyor screws, etc., to overcome the problem would require additional expenditures in equipment and energy. This would tend to offset any advantage in their implementation, especially when it is considered that the flow path of the material would be concomitantly extended and the danger of decomposition or other adverse influence on the material being handled would increase.

It is an object of the present invention to overcome the foregoing disadvantages and to provide a worm mixing apparatus for the continuous carrying out of physical or mechanical mixing as well as chemical reactions which can handle liquids, solids and/or gaseous components and achieve more efficient and versatile independently controllable mixing and conveying of materials so as to attain in turn accurate residence times and accurate quality and intensity of mixing.

It is another object of the present invention to provide means for positive discharge of mixed materials from a concentric worm mixing apparatus through an outlet, such as an axial outlet, at which an external or extraneous counterpressure is exerted, i.e. without decomposing or damaging the material or damaging the annular worm thread member.

It is still another object of the present invention to provide an arrangement of the foregoing type in which controlled back-conveying and back-mixing may be carried out for increasing and improving the mixing action, e.g. by appropriate auxiliary worm means on the core member.

It is a further object of the present invention to provide an improved concentric worm mixing apparatus combination of simple and efficient construction containing a minimum of conjunctive parts.

Other and further objects of the invention will become apparent from a study of the within specification and accompanying drawings, in which.

Figure 1:
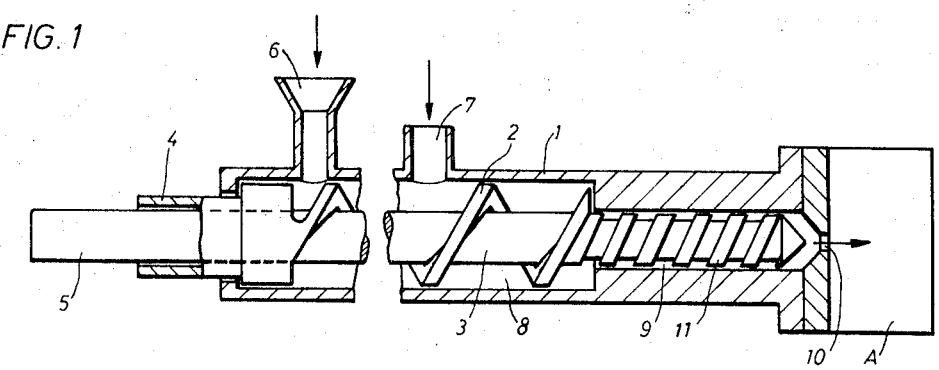
FIG. 1 is a schematic partial sectional view of one embodiment of a mixing apparatus in accordance with the invention used for positive discharge against a counterpressure.

It has now been found in accordance with the present invention that a mixing apparatus may be provided which comprises a housing having an inlet for introducing materials to be subjected to mixing treatment and an outlet for discharging mixed materials, a worm thread member disposed within the housing for rotation relative thereto for conveying materials mixed therein from the inlet to the outlet thereof, and a worm core member disposed within the housing for rotation relative thereto, and disposed within the worm thread member for coaxial rotation relative thereto for mixing materials conveyed by the worm thread member, said worm core member having worm thread means defined continuously along at least a portion of the axial length thereof, whereby in conjunction with said worm thread means materials progressively mixed by the rotation of the worm core member are conveyed from the inlet to the outlet by the worm thread member. When the worm thread means on the core member are adjacent the outlet, such as where a worm press extension is defined on the core member end at the outlet, the mixed material may be discharged effectively against a counterpressure exerted on the outlet. On the other hand, when such worm thread means are disposed in the main mixing section of the housing, a more intensive mixing is achieved, especially where the thread pitch thereof is counter to that of the worm thread means, e.g. by a back-flow screw thread arranged peripherally on the core member. In the latter instance, back-conveying and back-mixing take place to intensify the mixing action.

Preferably, the two worm members are maintained in wiping engagement with each other, i.e. the external diameter of the worm core member is substantially equal to the internal diameter of the worm thread member, whereby materials progressively mixed by the rotation of the core member are conveyed from the inlet to the outlet by the thread member substantially without intermixing of materials conveyed by adjoining convolutions of the thread member to maintain a uniform mixing residence time of the mixed material product discharged at the outlet. Of course, in this instance if worm means are provided on the core member portion in the main mixing area, the back-conveying and back-mixing action will be limited to the zone of the particular thread member convolution thereat.

It will be realized that while conventional discontinuous longitudinal grooves or transverse grooves or radial arms or studs may be provided peripherally on rotatable core members to increase the mixing action, only a local mixing effect can be achieved thereby. Known back-flow screw thread constructional arrangements used for increasing the mixing effect are of only limited value since a decrease results thereby in the output rate of the apparatus.

On the other hand, by providing such a back-flow screw thread on the worm core member in accordance with the present invention, an intensive mixing action is achieved yet the positive influence of the worm thread member on the material prevents undesired decrease in the output rate. A combination effect is thus achieved since the back-flow screw thread intensifies the mixing while the thread member exerts a positive conveying component on the material thereat to cause controlled rate progressive axial travel of the material from the input to the output despite any axial back-flow component exerted on the material by the back-flow screw.

Referring to the drawings, FIG. 1 shows a cylindrical housing 1 which contains in concentric relation a worm thread member 2 and a worm core member 3 which are driven separately at the shaft ends 4 and 5, respectively. Material enters housing 1 via inlet 6 for mixing in mixing section 8, passage through screw press section 9 and discharge through axial outlet 10. If desired, a further inlet or port 7 may be provided.

Preferably, worm thread member 2 is in the form of an annular helix surrounding cylindrical worm core member 3, these parts being rotatable relative to each other and relative to the housing 1. To increase the mixing effect, core member 3 may be provided with discontinuous longitudinal grooves or with peripheral or vertical grooves. Suitable variable speed gearings (not shown) may be provided for connection with shaft ends 4 and 5 to rotate members 2 and 3 independently of each other, i.e. at the same or different speeds of rotation and/or in the same or opposite directions. In this way, the mixing effect of the core member 3 and the conveying effect (and thus the residence time of the stream of product) of the thread member 2 can be adjusted and controlled independently.

This is especially true if the members 2 and 3 are in wiping contact with each other, i.e. where the worm core member external diameter is substantially equal to the worm thread member internal diameter, since materials being progressively mixed by rotation of the worm core member 3 are thus conveyed from the inlet 6 to the press section 9 by the worm thread member 2 substantially without intermixing of materials conveyed by adjoining convolutions of thread member 2 to maintain a uniform mixing residence time of the mixed material product eventually discharged at outlet 10.

A specific feature of the embodiment of FIG. 1 is the screw press section 9. The axial end of core member 3 adjacent outlet 10 is provided with a worm thread press extension 11 projecting into press section 9 and arranged to operate thereat against a counterpressure exerted at outlet 10. Press section 9 is generally of smaller diameter than mixing section 8 and is in flow communication therewith, although press extension 11 may be either of larger or smaller diameter than core member 3. The internal diameter of press section 9 is expediently provided in relation to the external diameter of press extension 11 to achieve a similar wiping contact or engagement coaxial relation to that preferably provided between members 2 and 3 in mixing section 8. Thus, mixed material conveyed by thread member 2 to press section 9 is taken by the adjacent threads of press extension 11, conveyed thereby under positive force along a helical path through press section 9, and discharged through outlet 10 against the counterpressure exerted thereat. Such counterpressure may be the result of any extraneous force such as that caused by a flow-connected filter press or nozzle element or the like, disposed at outlet 10 and shown schematically at A.

Of course, in order to discharge against a very high counterpressure, press extension 11 can be shaped conically at its free end and/or the pitch of the screw thread thereof may vary over the axial length thereof. When press extension 11 is conically shaped, the confining wall of press section 9 will be similarly shaped to accommodate the operative relationship desired.

Figure 2:
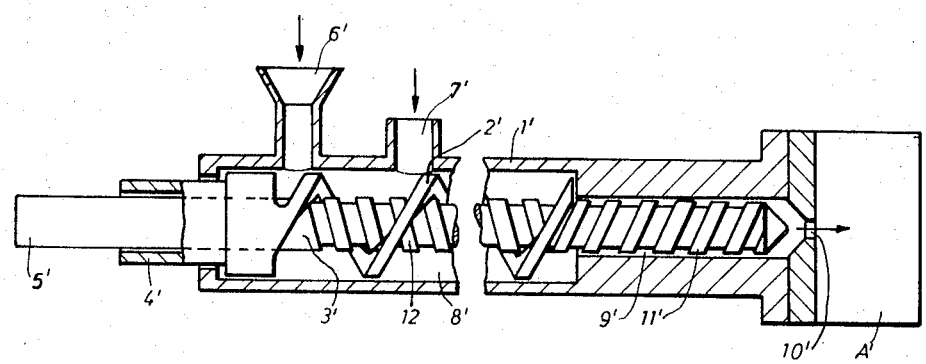
FIG. 2 is a schematic view similar to FIG. 1 and showing an alternate embodiment of the invention used for increasing and improving the mixing action as well as for positive discharge against a counterpressure.

FIG. 2 shows another embodiment of a mixing and conveying apparatus similar to that of FIG. 1, and like parts having like function, substantially, are shown with coresponding prime reference numerals, i.e. 1' to 10' and A'. However, in this embodiment, core member 3' is provided with a peripheral auxiliary worm thread 12 defined continuously along at least a portion of the axial length thereof to improve the mixing action. Worm core member 3', including worm thread 12, is preferably in wiping contact with annular worm thread member 2' to avoid back-mixing with material in adjoining convolutions of thread member 2'. On the other hand, the worm pitch of thread 12 may still be provided counter to the pitch direction of thread member 2' to achieve back-conveying and back-mixing of material within a given convolution of thread member 2', whereby positive and pronounced intensive intermixing is carried out prior to positive discharge of the mixed material product through outlet 10' against the counterpressure thereat.

Figure 3:
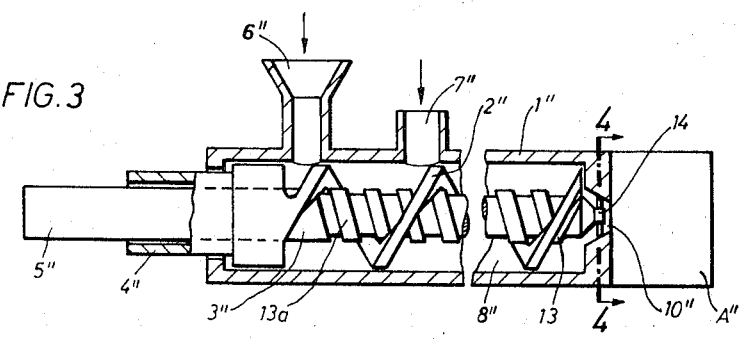
FIG. 3 is a schematic view similar to FIGS. 1 and 2 and showing an additional embodiment of the invention used for increasing and improving the mixing action as well as for such positive discharge.

FIG. 3 shows an alternate embodiment of a mixing and conveying apparatus, and insofar as it is similar to that of FIG. 1, like parts having like function, substantially, are shown with correspónding double prime refernce numerals, i.e. 1" to 8", 10" and A". However, no screw press section nor worm thread press extension is present. A peripheral auxiliary worm thread 13 is provided on worm core member 3" continuously along at least the axial portion thereof adjacent outlet 10" in a manner similar to thread 12 on core member 3' of FIG. 2, but here not only is the mixing action improved but by suitable direction of rotation of core member 3", material conveyed by worm thread member 2" is taken by thread 13 at outlet 10" and thereby forced under positive action through outlet 10" against the counterpressure thereat. Worm core member 3", including worm thread 13, is preferably in wiping contact with annular worm thread member 2" to avoid back-mixing with material in adjoining convolutions of thread member 2". On the other hand, the worm pitch of a portion 13a of thread 13 axially spaced from outlet 10" may still be provided counter to the pitch direction of thread member 2" to achieve back-conveying and back-mixing of material within a given convolution of thread member 2". In this way, positive and pronounced intensive intermixing may be carried out, prior to positive discharge of the mixed material product through outlet 10″ against a counterpressure thereat via the end portion of thread 13 acting as worm screw press with the wall of the housing 1″ at outlet 10″.

Figure 4:
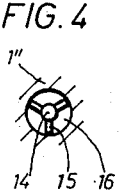
FIG. 4 is a schematic section taken along the line 4—4 of FIG. 3.

FIG. 4 shows the seat element 14 connected by legs 15 to the surrounding interior wall of housing 1″ at outlet 10″ whereby to guide the free end of core member 3″ thereat. The material forced by thread 13 at outlet 10″ passes through the openings 16 between legs 15.

It will be appreciated that the instant specification and drawings are set forth by way of illustration and not limitation, and that various modifications and changes may be made without departing from the spirit and scope of the present invention which is to be limited only by the scope of the appended claims.

What is claimed is:

1. Mixing apparatus which comprises a housing having an inlet for introducing materials to be subjected to mixing treatment and an outlet for discharging mixed materials against a counterpressure, a worm thread member disposed within the housing for rotation relative thereto for conveying materials mixed therein from the inlet to the outlet thereof, and a worm core member disposed within the housing for rotation relative thereto, and disposed within the worm thread member and occupying substantially completely the cross-sectional area within said worm thread member and furthermore being in wiping contact therewith for coaxial rotation relative thereto for mixing materials conveyed by the worm thread member, said worm core member having positive conveying worm thread means defined continuously along at least the portion of the axial length thereof at the outlet and arranged to operate thereat against a counterpressure, whereby in conjunction with said worm thread means materials progressively mixed by the rotation of the worm core member are conveyed from the inlet to the outlet by the worm thread member and discharged at said outlet against a counterpressure thereat via said worm thread means of the worm core member.

2. Mixing apparatus which comprises a housing having an inlet for introducing materials to be subjected to mixing treatment, an axial outlet for discharging mixed materials against a counterpressure, a mixing section adjacent the inlet, and an axial press section adjacent the outlet and flow communicating the mixing section with the outlet, a worm thread member disposed within said housing at said mixing section for rotation relative thereto for conveying materials mixed therein from the inlet to the press section, and a worm core member disposed within said housing at said mixing section for rotation relative thereto, and disposed within said worm thread member and occupying substantially completely the cross-sectional area within said worm thread member and furthermore being in wiping contact therewith for coaxial rotation relative thereto for mixing materials conveyed by said worm thread member, said worm core member having a worm thread press extension projecting therefrom into said press section and arranged to operate thereat against the counterpressure at the outlet, whereby materials progressively mixed by the rotation of the worm core member are conveyed from the inlet to the press section by the worm thread member and such mixed material product is pressed by the worm thread press extension through the outlet to discharge such product against a counterpressure thereat.

3. Apparatus according to claim 2 wherein a peripheral auxiliary worm thread means is defined continuously along at least a portion of the axial length of the worm core member disposed in the mixing section to improve the mixing action.

4. Apparatus according to claim 3 wherein the auxiliary worm thread means has a thread pitch counter to that of the worm thread member for back-conveying and back-mixing of material thereat with material being conveyed by the worm thread member toward the outlet to achieve intensive intermixing of such material prior to positive discharge thereof against the counterpressure at the outlet.

5. Mixing apparatus which comprises a housing having an inlet for introducing materials to be subjected to mixing treatment, an axial outlet for discharging mixed materials against a counterpressure, a mixing section adjacent the inlet, and an axial press section adjacent the outlet and flow communicating the mixing section with the outlet, an annular worm thread member disposed within said housing at said mixing section for rotation relative thereto for conveying materials mixed therein from the inlet to the press section, and a worm core member disposed within said housing at said mixing section for rotation relative thereto, and disposed within said worm thread member for coaxial rotation relative thereto for mixing materials conveyed by said worm thread member, said worm core member occupying substantially completely the cross-sectional area within said annular worm thread member and having an external diameter substantially equal to the internal diameter of the worm thread member for wiping engagement therewith and furthermore having a worm thread press extension projecting therefrom into said press section and arranged to operate thereat against the counterpressure at the outlet, whereby materials progressively mixed by the rotation of the worm core member are conveyed from the inlet to the press section by the worm thread member substantially without intermixing of materials conveyed by adjoining convolutions of the worm thread member to maintain a uniform mixing residence time of the mixed material product conveyed into the press section and whereby such conveyed product is pressed by the worm thread press extension through the outlet to discharge such product against a counterpressure thereat.

6. Apparatus according to claim 5 wherein a peripheral auxiliary worm thread means is defined continuously along at least a portion of the axial length of the worm core member disposed in the mixing section to improve the mixing action, said auxiliary worm thread means having an external diameter substantially equal to the internal diameter of the worm thread member for wiping engagement therewith.

7. Apparatus according to claim 6 wherein the auxiliary worm thread means has a thread pitch counter to that of the worm thread member to achieve intensive intermixing of such materials prior to positive discharge thereof against the counterpressure at the outlet.

8. Apparatus according to claim 5 wherein the worm thread member and the worm core member are disposed for rotation in the same direction.

9. Apparatus according to claim 5 wherein the worm thread member and the worm core member are disposed for rotation in opposite directions.

10. Mixing apparatus which comprises a housing having an inlet for introducing materials to be subjected to mixing treatment and an axial outlet for discharging mixed materials against a counterpressure, an annular worm thread member disposed within said housing for rotation relative thereto for conveying materials mixed therein from the inlet to the outlet thereof, and a worm core member disposed within said housing for rotation relative thereto, and disposed within said worm thread member and occupying substantially completely the cross-sectional area within said annular worm thread member for coaxial rotation relative thereto for mixing materials conveyed by said worm thread member, said worm core member having peripheral auxiliary worm thread means defined continuously along at least the portion of the axial length of the worm core member adjacent the outlet to improve the mixing action and exert a positive mixed material product discharge through the outlet, and said worm member including said auxiliary worm thread means having an external diameter substantially equal to the internal diameter of the worm thread member for wiping engagement therewith, whereby materials progressively mixed by the rotation of the worm core member under the positive mixing influence of the auxiliary worm thread means thereat are conveyed from the inlet to the outlet by the worm thread member substantially without intermixing of materials conveyed by adjoining convolutions of the worm thread member to maintain a uniform mixing residence time of the mixed material product and whereby such conveyed product is pressed under positive force exerted thereon by the auxiliary worm thread means through the outlet to discharge such product against a counterpressure thereat.

References Cited

UNITED STATES PATENTS

| | | | |
|---|---|---|---|
| 3,186,602 | 6/1965 | Ricciardi | 259—41 XR |
| 3,269,708 | 8/1966 | Leister | 259—6 |
| 3,352,543 | 11/1967 | Niederman et al. | 259—105 XR |

FOREIGN PATENTS 18,277  9/1894  Great Britain.

ROBERT W. MICHELL, *Primary Examiner.*

JOHN M. BELL, *Assistant Examiner.*

U.S. Cl. X.R.

259—41, 105

UNITED STATES PATENT OFFICE
CERTIFICATE OF CORRECTION

Patent No. 3,452,965
July 1, 1969

Karl Leister

It is certified that error appears in the above identified patent and that said Letters Patent are hereby corrected as shown below:

Column 6, line 75, after "worm", first occurrence, insert -- core --.

Signed and sealed this 3rd day of February 1970.

(SEAL)
Attest:

Edward M. Fletcher, Jr.
Attesting Officer

WILLIAM E. SCHUYLER, JR.
Commissioner of Patents